UNITED STATES PATENT OFFICE.

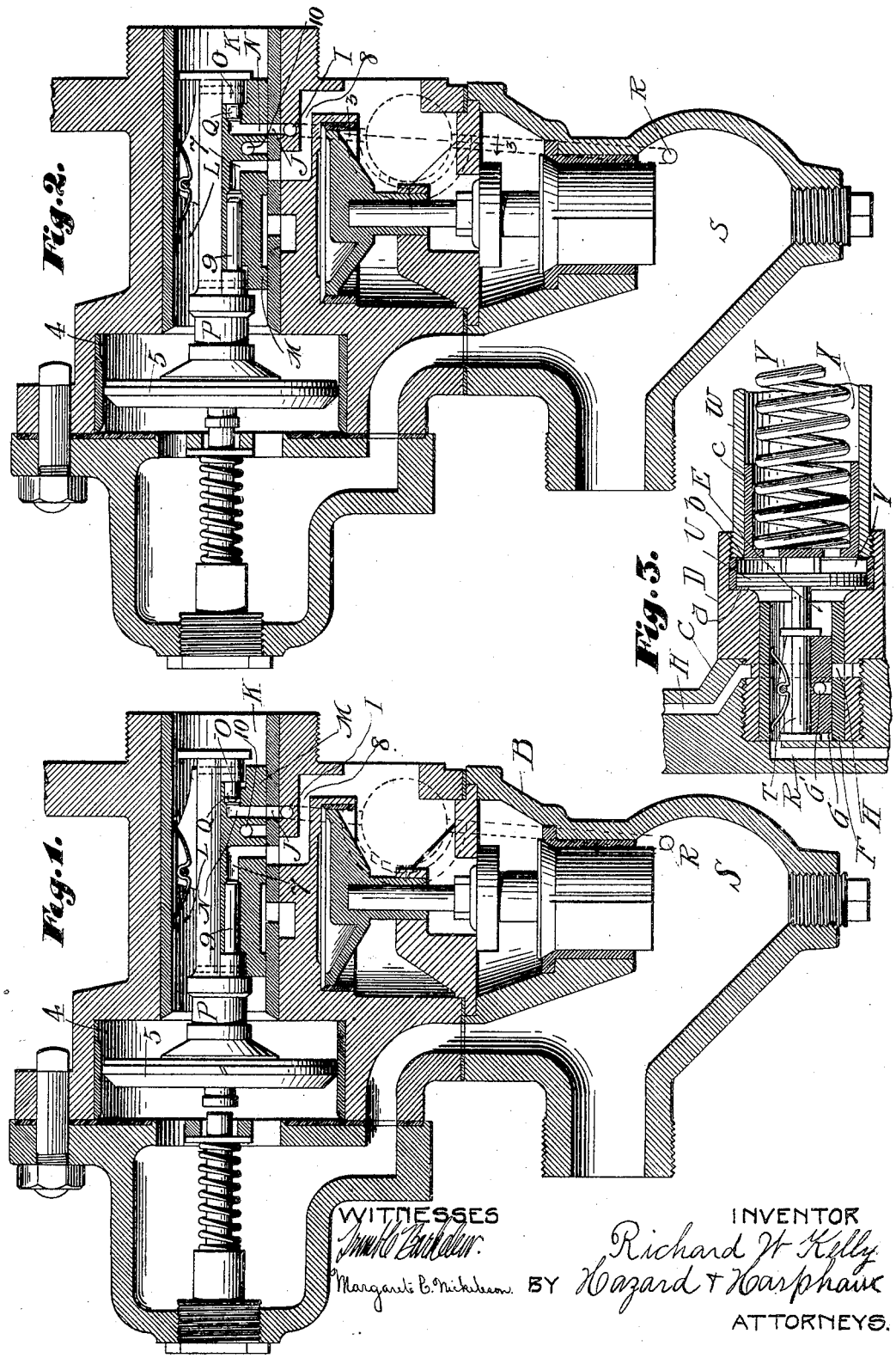

RICHARD W. KELLY, OF LOS ANGELES, CALIFORNIA, ASSIGNOR OF ONE-FOURTH TO HENRY T. HAZARD AND ONE-FOURTH TO GEORGE E. HARPHAM, OF LOS ANGELES, CALIFORNIA.

AIR-BRAKE MECHANISM.

No. 804,136.     Specification of Letters Patent.     Patented Nov. 7, 1905.

Application filed September 3, 1904. Serial No. 223,287.

*To all whom it may concern:*

Be it known that I, RICHARD W. KELLY, a citizen of the United States, residing at Los Angeles, in the county of Los Angeles and State of California, have invented new and useful Improvements in Air-Brake Mechanism, of which the following is a specification.

The objects of my invention are to enable the engineer to recharge the auxiliary reservoir while the brakes are set, also to equalize the pressure in the different auxiliary reservoirs while the brakes are set. I accomplish these objects by the mechanism described herein and illustrated in the accompanying drawings, in which—

Figures 1 and 2 are longitudinal central sections of the triple valve in common use in what is known as the "Westinghouse" air-brake with my improvements attached thereto. Fig. 1 shows my improvement in operative position to permit the engineer to recharge the auxiliary reservoir under the respective cars during a service application. Fig. 2 shows the same with my improvement in its inoperative position. Fig. 3 is a section on the line 3 3 of Fig. 2 of so much of the mechanism as is necessary to show the operation of the pressure-regulating valve which controls the channel through which the recharging of the auxiliary reservoir is effected.

In the drawings the triple valve, which so far as the performance of its functions in braking is concerned—that is to say, effecting the closure between the main air-pipe and the auxiliary reservoir and the opening of communication between the auxiliary reservoir and the brake-cylinder in applying the brakes and the reverse operations in releasing the brakes—accords substantially in construction with that set forth in Letters Patent of the United States No. 376,837, granted to George Westinghouse, Jr., January 24, 1888, and therefore, saving as to the structural features by which it performs the further function of effecting the direct admission of air from the main air-pipe to the auxiliary reservoir while the brakes are set on service application, to be presently described, requires no further description.

In the drawings, 4 is the ordinary feed-groove through which air is fed from the train-pipe through the main slide-valve chamber into the auxiliary reservoir, (not shown,) around piston 5 when said piston is in its release position, which may be called the "main" communication between the train-pipe and the auxiliary reservoir. In service applications air is admitted through port 6 into channel 7 of the main slide-valve, through which it passes into channel 8 and thence to the brake-cylinder. (Not shown.) In service applications after the brakes have been set the air-supply to the brake-cylinder is controlled by graduating-valve 9 in the well-known manner. So far the construction and use are the ordinary construction and use of the Westinghouse triple valve, except that emergency-port 10 opens to auxiliary pressure at the side instead of the end of the main slide-valve.

Upon the side of the case B of the triple valve is cast a boss C, into which is bored a hole which is interiorly threaded for the reception of the casing D of the pressure-valve chamber E, which chamber is lined with an open-end bushing F, on which is formed the seat of the pressure slide-valve G, which has a channel G' therein. This slide-valve is fitted to reciprocate on said seat to establish or cut off communication between said chamber and port H in the bushing. Port H is connected by channel I to port J in the bushing K of the main slide-valve chamber L of the triple valve. The main slide-valve M is provided with an L-shaped channel N, one side of which is brought into register with port J when the main slide-valve is brought to the service position, as shown in Figs. 1 and 2. A supplemental graduating-valve O is secured to the stem P, which operates the main slide-valve and reciprocates in the other side of channel L and governs the passage of air through said channel, which passes into and out of said channel through port Q in the side thereof, as hereinafter explained.

Pressure-valve chamber E is connected by channel R with chamber S of the triple valve which receives train-line pressure. Pressure slide-valve G is reciprocated on its seat by stem T, which is affixed to piston U, which piston reciprocates in piston-chamber V, which is formed in the rear end of casing D. In the end of the casing of piston-chamber V is secured casing W of the spring-chamber X, in which is housed spring Y, which normally holds piston U in contact with gasket $a$, which forms a seat therefor and makes the joint therebetween air-tight. In the rear of this piston-chamber is a gasket $b$, which forms a seat for the rear face of the piston when in engagement therewith to make an air-tight joint. A guide-bushing $c$ keeps the spring from buckling. The tension of spring Y is regulated in the well-known manner for the regulation of such devices, and an air-port (not shown) is formed in the rear end of the casing of this chamber. Channels I and R constitute an independent or secondary channel from the train-pipe to the auxiliary.

In the operation of my device the tension of spring Y is set at the pressure at which it is desired that valve G shall move to bring channel G' into register with port H. This is preferably seventy pounds, as it is unnecessary to recharge the auxiliary reservoir while the brakes are set when the auxiliary-reservoir pressure is below seventy pounds, because if the grade is such that seventy pounds pressure in the auxiliary reservoir will give sufficient braking power the auxiliary reservoir can be recharged in the usual manner. In making a service application the main slide-valve of the triple valve is moved to cut off the communication between the brake-cylinder and the exhaust-port and to establish communication between the brake-cylinder and the auxiliary reservoir in the usual well-known manner. During this time port Q is closed by the supplemental graduating-valve O, and the operation of the triple valve is not effected by my improvement thereto. Now when the main graduating-valve of the triple valve is returned to a position to cut off the supply of air from the auxiliary reservoir to the brake-cylinder the supplemental graduating-valve O is moved by stem P so as to uncover port Q, so that a limited amount of air will pass through channel R and into the auxiliary reservoir whenever the pressure in the train-pipe exceeds the tension of the spring Y and moves the pressure slide-valve G to establish communication between the pressure-valve chamber E and channel I. By this means when coming down the mountains, where great braking power is required and where a pressure of over seventy pounds and as high as ninety pounds is used in the auxiliary reservoir the reservoirs can be recharged, while the brakes are set in service application when the triple valve is in what is known as "lap" position, and the pressure in the different auxiliary reservoirs will equalize through the train-pipe. It will also be observed that upon an emergency application channel N is carried out of register with port J, so that the efficiency of the triple valve on the emergency application is not interfered with. When these high pressures are used and it is desired to release the brakes, the pressure in the train-line and in the reservoirs is reduced to a little below seventy pounds, when the connection between channel I and channel G' of the pressure slide-valve is cut off and the brakes are released in the ordinary well-known manner.

It will be observed that by the use of my device any desired pressure above seventy pounds may be maintained in all of the auxiliary reservoirs. By the use of my device the complete control of the pressure on the brakes is given solely to the engineer in charge of the train, and the pressure-retaining valves may be dispensed with, as they are no longer needed.

Having described my invention, what I claim as new, and desire to secure by Letters Patent, is—

1. The combination in a triple-valve device of a case or chest having chambers and ports and passages therein; a single slide-valve having ports and passages therein governing ports and passages in the case leading to connections between an auxiliary reservoir and a brake-cylinder and between the brake-cylinder and the atmosphere, and between the auxiliary reservoir and the train-pipe; a piston working in a chamber in said case; a stem secured to said piston and actuating said slide-valve; oppositely-disposed graduating-valves secured to the stem which actuates said slide-valve, said graduating-valves controlling the communication through passages in said main slide-valve which provide communication between the auxiliary reservoir and the brake-cylinder and between the auxiliary reservoir and the train-pipe, said graduating-valves being so arranged that only one of the passages controlled thereby is open at any one time.

2. In a brake mechanism a triple valve having a piston and a stem, a single slide-valve arranged on such stem, said stem having a short range of motion independent of such valve; a valve-chamber in which said valve works; ports and passages in the said valve and in the case inclosing the same leading to connections between an auxiliary reservoir and a brake-cylinder, and between an auxiliary reservoir and the train-line; and two graduating-valves affixed to said piston-stem and controlling communication between passages leading to connections between the auxiliary reservoirs and the brake-cylinder, and between the main air-pipe and the auxiliary reservoir respectively, one of said graduating-valves closing one of said communications when the other graduating-valve opens the other communication.

3. In a brake mechanism a triple valve having a piston provided with a stem; a slide-valve arranged on such stem and actuated thereby, said stem having a short range or motion without moving said valve; a valve-chamber containing said valve; ports and passages in said valve and in the case inclosing the same leading to connections with an auxiliary air-reservoir and a brake-cylinder and to the atmosphere, and to the train-line; two graduating-valves actuated by said piston-stem and controlling communication between passages leading to connections between the auxiliary reservoir and the brake-cylinder, and between the main air-pipe and the auxiliary reservoir respectively, one of said graduating-valves closing one of said communications when the other graduating-valve opens the other communication; a supplementary slide-valve controlling the passage from the train-line to the auxiliary reservoir.

4. In a brake mechanism a secondary passage forming a connection between the auxiliary reservoir and the train-pipe, said connection being controlled by the main slide-valve of the triple valve and a spring-pressed slide-valve actuated by pressure from the train-pipe on said secondary passage.

In witness that I claim the foregoing I have hereunto subscribed my name this 26th day of August, 1904.

RICHARD W. KELLY.

Witnesses:
G. E. HARPHAM,
HENRY T. HAZARD.